United States Patent
Buehne et al.

(10) Patent No.: US 9,747,311 B2
(45) Date of Patent: Aug. 29, 2017

(54) SOLUTION TO GENERATE A SCRIPTSET FOR AN AUTOMATED DATABASE MIGRATION

(71) Applicant: ORACLE INTERNATIONAL CORPORATION, Redwood Shores, CA (US)

(72) Inventors: Stephan Buehne, Treibweg (DE); Elmar Spiegelberg, Am Kleefeldchen (DE)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 934 days.

(21) Appl. No.: 13/937,988

(22) Filed: Jul. 9, 2013

(65) Prior Publication Data
US 2015/0019479 A1  Jan. 15, 2015

(51) Int. Cl.
*G06F 17/30* (2006.01)

(52) U.S. Cl.
CPC .................. *G06F 17/303* (2013.01)

(58) Field of Classification Search
CPC .......................... G06F 17/30289; G06F 17/303
See application file for complete search history.

(56) References Cited

U.S. PATENT DOCUMENTS

| | | | |
|---|---|---|---|
| 6,016,394 A * | 1/2000 | Walker | G06F 8/30 717/104 |
| 6,185,625 B1 | 2/2001 | Tso et al. | |
| 6,477,483 B1 | 11/2002 | Scarlat et al. | |
| 6,738,811 B1 | 5/2004 | Liang | |
| 6,973,489 B1 | 12/2005 | Levy | |
| 7,177,866 B2 * | 2/2007 | Holenstein | G06F 11/2064 707/615 |
| 7,290,003 B1 | 10/2007 | Tong | |
| 7,548,898 B1 | 6/2009 | Tarenskeen et al. | |
| 7,580,862 B1 | 8/2009 | Montelo et al. | |
| 7,693,983 B1 | 4/2010 | Gupta et al. | |
| 8,150,811 B1 | 4/2012 | Tarenskeen et al. | |
| 8,271,757 B1 | 9/2012 | Chatterjee et al. | |

(Continued)

FOREIGN PATENT DOCUMENTS

| | | |
|---|---|---|
| CN | 1652087 A | 8/2005 |
| CN | 105308577 A | 2/2016 |

(Continued)

OTHER PUBLICATIONS

U.S. Appl. No. 13/937,868, Non-Final Office Action mailed on Nov. 4, 2015, 18 pages.

(Continued)

*Primary Examiner* — Tarek Chbouki
(74) *Attorney, Agent, or Firm* — Kilpatrick Townsend & Stockton LLP

(57) ABSTRACT

The migration of a database may be accomplished, at least in part, by careful preparation and analysis of the database objects prior to migration. Migration may be performed more timely, efficiently, and reliably if the source database and its objects are first analyzed to determine the properties of the data, relationships, dependencies, and the like. The length of time of the copying and installation is reduced may selecting appropriate operations for different object types.

20 Claims, 6 Drawing Sheets

(56) References Cited

U.S. PATENT DOCUMENTS

| | | | |
|---|---|---|---|
| 8,606,894 | B1 | 12/2013 | Fremont et al. |
| 8,639,989 | B1 | 1/2014 | Sorenson, III et al. |
| 8,924,353 | B1* | 12/2014 | Patwardhan ...... G06F 17/30289 |
| | | | 707/640 |
| 8,943,032 | B1 | 1/2015 | Xu et al. |
| 9,098,364 | B2 | 8/2015 | Davis |
| 9,442,983 | B2 | 9/2016 | Higginson et al. |
| 9,491,072 | B2 | 11/2016 | Raghunathan et al. |
| 2001/0029502 | A1* | 10/2001 | Oeda ................. G06F 17/30578 |
| 2002/0002578 | A1 | 1/2002 | Yamashita |
| 2002/0019826 | A1 | 2/2002 | Tan |
| 2002/0147645 | A1 | 10/2002 | Alao et al. |
| 2002/0194329 | A1 | 12/2002 | Alling |
| 2002/0198984 | A1 | 12/2002 | Goldstein et al. |
| 2003/0066049 | A1 | 4/2003 | Atwood et al. |
| 2003/0069903 | A1 | 4/2003 | Gupta et al. |
| 2003/0192028 | A1 | 10/2003 | Gusler et al. |
| 2004/0098425 | A1* | 5/2004 | Wiss .................. G06F 11/2071 |
| 2004/0167840 | A1 | 8/2004 | Tully et al. |
| 2004/0178261 | A1 | 9/2004 | Potonniee et al. |
| 2004/0181790 | A1 | 9/2004 | Herrick |
| 2004/0260875 | A1 | 12/2004 | Murotani et al. |
| 2005/0021567 | A1* | 1/2005 | Holenstein ........... G06Q 10/087 |
| 2005/0055446 | A1 | 3/2005 | Chidambaran et al. |
| 2005/0102318 | A1 | 5/2005 | Odhner et al. |
| 2005/0204241 | A1 | 9/2005 | Tamakoshi |
| 2006/0059253 | A1* | 3/2006 | Goodman .............. G06Q 10/10 |
| | | | 709/223 |
| 2006/0112247 | A1 | 5/2006 | Ramany et al. |
| 2006/0156086 | A1 | 7/2006 | Flynn et al. |
| 2006/0173875 | A1 | 8/2006 | Stefaniak et al. |
| 2006/0179171 | A1 | 8/2006 | Stefaniak et al. |
| 2006/0179431 | A1 | 8/2006 | Devanathan et al. |
| 2006/0235899 | A1 | 10/2006 | Tucker |
| 2006/0282825 | A1 | 12/2006 | Taylor |
| 2007/0150488 | A1 | 6/2007 | Barsness et al. |
| 2007/0239774 | A1 | 10/2007 | Bodily et al. |
| 2007/0299892 | A1 | 12/2007 | Nakahara |
| 2008/0247320 | A1 | 10/2008 | Grah et al. |
| 2008/0313595 | A1 | 12/2008 | Boulineau et al. |
| 2009/0070733 | A1 | 3/2009 | Huang et al. |
| 2009/0113399 | A1 | 4/2009 | Tzoref et al. |
| 2009/0187413 | A1 | 7/2009 | Abels et al. |
| 2009/0210857 | A1 | 8/2009 | Martineau |
| 2009/0238078 | A1 | 9/2009 | Robinson et al. |
| 2009/0313311 | A1* | 12/2009 | Hoffmann ........... G06F 11/2094 |
| 2010/0005097 | A1 | 1/2010 | Liang et al. |
| 2010/0191884 | A1* | 7/2010 | Holenstein .......... G06F 11/2094 |
| | | | 710/200 |
| 2010/0192156 | A1 | 7/2010 | Hollingsworth |
| 2010/0198799 | A1 | 8/2010 | Krishnan et al. |
| 2010/0262974 | A1 | 10/2010 | Uyeda |
| 2011/0093436 | A1* | 4/2011 | Zha .................. G06F 17/30592 |
| | | | 707/639 |
| 2011/0107327 | A1 | 5/2011 | Barkie et al. |
| 2011/0161933 | A1 | 6/2011 | Hudson |
| 2012/0017112 | A1 | 1/2012 | Broda et al. |
| 2012/0041933 | A1 | 2/2012 | Driesen |
| 2012/0150642 | A1 | 6/2012 | Kandanala et al. |
| 2012/0221845 | A1 | 8/2012 | Ferris |
| 2012/0254435 | A1 | 10/2012 | Zhaofu et al. |
| 2012/0265726 | A1 | 10/2012 | Padmanabhan et al. |
| 2012/0284360 | A1 | 11/2012 | Bense et al. |
| 2012/0297016 | A1 | 11/2012 | Iyer et al. |
| 2012/0303739 | A1 | 11/2012 | Ferris |
| 2012/0311128 | A1 | 12/2012 | Pechanec et al. |
| 2013/0067298 | A1 | 3/2013 | Li et al. |
| 2013/0085742 | A1 | 4/2013 | Barker et al. |
| 2013/0085989 | A1 | 4/2013 | Nayyar et al. |
| 2013/0152050 | A1 | 6/2013 | Chang et al. |
| 2013/0173546 | A1 | 7/2013 | Cline et al. |
| 2013/0173547 | A1 | 7/2013 | Cline et al. |
| 2013/0211559 | A1 | 8/2013 | Lawson et al. |
| 2013/0268643 | A1 | 10/2013 | Chang et al. |
| 2013/0268799 | A1 | 10/2013 | Mestery et al. |
| 2013/0268800 | A1 | 10/2013 | Rangaiah |
| 2013/0283364 | A1 | 10/2013 | Chang et al. |
| 2013/0297802 | A1 | 11/2013 | Laribi et al. |
| 2013/0311968 | A1 | 11/2013 | Sharma |
| 2013/0326028 | A1 | 12/2013 | Cox et al. |
| 2014/0007216 | A1 | 1/2014 | Ahn |
| 2014/0019961 | A1 | 1/2014 | Neuse et al. |
| 2014/0059559 | A1 | 2/2014 | Alatorre et al. |
| 2014/0075033 | A1 | 3/2014 | Doering et al. |
| 2014/0089809 | A1 | 3/2014 | Levy et al. |
| 2014/0109053 | A1 | 4/2014 | Vasudevan et al. |
| 2014/0172782 | A1 | 6/2014 | Schuenzel et al. |
| 2014/0195636 | A1 | 7/2014 | Karve et al. |
| 2014/0279890 | A1 | 9/2014 | Srinivasan et al. |
| 2014/0337429 | A1 | 11/2014 | Asenjo et al. |
| 2014/0344439 | A1 | 11/2014 | Kempf et al. |
| 2015/0019195 | A1 | 1/2015 | Davis |
| 2015/0019197 | A1 | 1/2015 | Higginson et al. |
| 2015/0019478 | A1 | 1/2015 | Buehne et al. |
| 2015/0019487 | A1 | 1/2015 | Buehne et al. |
| 2015/0019488 | A1 | 1/2015 | Higginson et al. |
| 2015/0019564 | A1 | 1/2015 | Higginson et al. |
| 2015/0019700 | A1 | 1/2015 | Masterson et al. |
| 2015/0019706 | A1 | 1/2015 | Raghunathan et al. |
| 2015/0019707 | A1 | 1/2015 | Raghunathan et al. |
| 2015/0020059 | A1 | 1/2015 | Davis |
| 2016/0364229 | A1 | 12/2016 | Higginson et al. |

FOREIGN PATENT DOCUMENTS

| | | |
|---|---|---|
| CN | 105324756 A | 2/2016 |
| CN | 105324769 A | 2/2016 |
| CN | 105359102 A | 2/2016 |
| CN | 105359146 A | 2/2016 |
| CN | 105359147 A | 2/2016 |
| CN | 105393250 A | 3/2016 |
| CN | 105556515 | 5/2016 |
| CN | 105580032 | 5/2016 |
| EP | 2418591 | 2/2012 |
| EP | 3019958 | 5/2016 |
| EP | 3019961 | 5/2016 |
| EP | 3019962 | 5/2016 |
| EP | 3019975 | 5/2016 |
| EP | 3019976 | 5/2016 |
| EP | 3019979 | 5/2016 |
| EP | 3019980 | 5/2016 |
| EP | 3019981 | 5/2016 |
| EP | 3020010 | 5/2016 |
| GB | 2468742 | 9/2010 |
| JP | 2006277153 | 10/2006 |
| WO | 0153949 | 7/2001 |
| WO | 2015/005991 | 1/2015 |
| WO | 2015/005994 | 1/2015 |
| WO | 2015/006124 | 1/2015 |
| WO | 2015/006129 | 1/2015 |
| WO | 2015/006132 | 1/2015 |
| WO | 2015/006137 | 1/2015 |
| WO | 2015/006138 | 1/2015 |
| WO | 2015/006308 | 1/2015 |
| WO | 2015/006358 | 1/2015 |

OTHER PUBLICATIONS

U.S. Appl. No. 13/937,545, Non-Final Office Action mailed on Nov. 10, 2015, 19 pages.
U.S. Appl. No. 13/937,344, Final Office Action mailed on Feb. 11, 2016, all pages.
U.S. Appl. No. 13/937,970, Final Office Action mailed on Dec. 10, 2015, all pages.
U.S. Appl. No. 13/937,486, Non-Final Office Action mailed on Jan. 11, 2016, all pages.
International Preliminary Report on Patentability of PCT/US2014/045247, mailed on Jan. 21, 2016, all pages.
International Preliminary Report on Patentability of PCT/US2014/045804, mailed on Jan. 21, 2016, all pages.
International Preliminary Report on Patentability of PCT/US2014/045721, mailed on Jan. 21, 2016, all pages.

(56) References Cited

OTHER PUBLICATIONS

International Preliminary Report on Patentability of PCT/US2014/045282, mailed on Jan. 21, 2016, all pages.
International Preliminary Report on Patentability of PCT/US2014/045289, mailed on Jan. 21, 2016, all pages.
International Preliminary Report on Patentability of PCT/US2014/045240, mailed on Jan. 21, 2016, all pages.
Notification of Transmittal of the International Preliminary Report on Patentability of PCT/US2014/040486, mailed on Oct. 1, 2015, all pages.
Notification of Transmittal of the International Preliminary Report on Patentability of PCT/US2014/040692, mailed on Oct. 8, 2015, all pages.
International Preliminary Report on Patentability of PCT/US2014/045226, mailed on Jan. 21, 2016, all pages.
Baysal, et al., "A Bug You Like: A Framework for Automated Assignment of Bugs", 2009.
U.S. Appl. No. 13/937,868, Final Office Action mailed on Apr. 22, 2016, all pages.
U.S. Appl. No. 13/937,483, Final Office Action mailed on Feb. 26, 2016, all pages.
U.S. Appl. No. 13/937,970, Non-Final Office Action mailed on May 5, 2015, 17 pages.
U.S. Appl. No. 13/937,977, Final Office Action mailed on Feb. 26, 2015, 30 pages.
U.S. Appl. No. 13/938,066, Notice of Allowance mailed on Apr. 29, 2015, 15 pages.
U.S. Appl. No. 13/937,344, Notice of Allowance mailed on May 4, 2016, 11 pages.
U.S. Appl. No. 13/937,344, Notice of Allowance mailed on Jun. 6, 2016, 5 pages.
U.S. Appl. No. 13/937,483, Advisory Action mailed on May 12, 2016, 3 pages.
U.S. Appl. No. 13/937,545, Final Office Action mailed on May 13, 2016, 20 pages.
U.S. Appl. No. 13/937,970, Non-Final Office Action mailed on May 12, 2016, 28 pages.
U.S. Appl. No. 13/937,977, Notice of Allowance mailed on Mar. 16, 2016, 18 pages.
U.S. Appl. No. 13/937,344, Non-Final Office Action mailed on Sep. 24, 2015, 11 pages.
U.S. Appl. No. 13/937,483, Non-Final Office Action mailed on Sep. 25, 2015, 13 pages.
U.S. Appl. No. 13/937,977, Non-Final Office Action mailed on Aug. 19, 2015, 34 pages.
U.S. Appl. No. 13/938,066, Corrected Notice of Allowability mailed on Jun. 2, 2015, 2 pages.
International Application No. PCT/US2014/040486, Written Opinion mailed on Jun. 17, 2015, 7 pages.
International Application No. PCT/US2014/040692, Written Opinion mailed on Jul. 16, 2015, 7 pages.
U.S. Appl. No. 13/937,977, Non-Final Office Action mailed on Aug. 12, 2014, 28 pages.
Charles, Bug Severity vs. Priority, Quality of Intelligence Blog, Retrieved on Aug. 4, 2014, from http://quality-intelligence.blogspot.com/2010/08/bug-severity-vs-priority.html, Aug. 22, 2010, 6 pages.
Das et al., Albatross: Lightweight elasticity in shared storage databases for the cloud using live data migration, 37th International Conference on Very Large Data Bases, Proceedings of the VLDB Endowment, vol. 4, No. 8, Retrieved from the Internet:URL:http://www.cs.ucsb.eduj-sudiptojpapers/albatross.pdf, Aug. 29, 2011, 12 pages.
International Application No. PCT/US2014/040486, International Search Report and Written Opinion mailed on Sep. 29, 2014, 11 pages.
International Application No. PCT/US2014/040692, International Search Report and Written Opinion mailed on Oct. 8, 2014, 8 pages.
International Application No. PCT/US2014/045247, International Search Report and Written Opinion mailed on Sep. 3, 2014, 8 pages.
International Application No. PCT/US2014/045282, International Search Report and Written Opinion mailed on Sep. 18, 2014, 12 pages.
Chanchary et al., Data Migration: Connecting Databases in the Cloud, ICCIT 2012, Saudi Arabia, retrieved from the Internet: <URL:http://www.chinacloud.cnjupload/2012-03/12033108076850.pdf>, Jun. 28, 2012, pp. 450-455.
Leite et al., Migratool: Towards a Web-Based Spatial Database Migration Tool, IEEE Computer Society, Proceedings of the 16th International Workshop on Database and Expert Systems Applications, Aug. 22, 2005, pp. 480-484.
Tao et al., Intelligent database placement in cloud environment, Web Services (ICWS), 2012 IEEE 19th International Conference, IEEE Computer Society, Jun. 24, 2012, pp. 544-551.
U.S. Appl. No. 13/938,066, Non-Final Office Action mailed on Dec. 17, 2014.
International Application No. PCT/US2014/045226, International Search Report and Written Opinion mailed on Oct. 30, 2014, 10 pages.
International Application No. PCT/US2014/045240, International Search Report and Written Opinion mailed on Oct. 21, 2014, 10 pages.
International Application No. PCT/US2014/045289, International Search Report and Written Opinion mailed on Oct. 15, 2014, 9 pages.
International Application No. PCT/US2014/045721, International Search Report and Written Opinion mailed on Nov. 4, 2014, 12 pages.
International Application No. PCT/US2014/045804, International Search Report and Written Opinion mailed on Nov. 17, 2014, 12 pages.
U.S. Appl. No. 13/937,344, Notice of Allowance mailed on Oct. 11, 2016, 2 pages.
U.S. Appl. No. 13/937,486, Non-Final Office Action mailed on Nov. 4, 2016, 20 pages.
U.S. Appl. No. 13/937,970, Final Office Action mailed on Dec. 1, 2016, 22 pages.
U.S. Appl. No. 13/937,483, Notice of Allowance mailed on Jan. 20, 2017, 8 pages.
U.S. Appl. No. 13/937,545, Non-Final Office Action mailed on Feb. 7, 2017, 19 pages.
European Application No. 14745014.2, Office Action mailed on Jan. 18, 2017, 8 pages.
To et al., Best Practices for Database Consolidation on Exadata Database Machine, Oracle, Oracle White Paper, 2011, 35 pages.
Vengurlekar et al., Best Practices for Database Consolidation in Private Clouds, Oracle, Oracle White Paper,, Mar. 2012, 29 pages.
U.S. Appl. No. 13/937,344, Corrected Notice of Allowability mailed on Sep. 15, 2016, 2 pages.
U.S. Appl. No. 13/937,483, Non-Final Office Action mailed on Aug. 12, 2016, 13 pages.
U.S. Appl. No. 13/937,486, Final Office Action mailed on Jul. 28, 2016, 18 pages.
U.S. Appl. No. 13/937,885, Non-Final Office Action mailed on Aug. 18, 2016, 32 pages.
U.S. Appl. No. 13/937,977, Corrected Notice of Allowability mailed on Jul. 18, 2016, 2 pages.
U.S. Appl. No. 13/938,061, Non-Final Office Action mailed on Aug. 18, 2016, 29 pages.
U.S. Appl. No. 13/938,061, Final Office Action dated Mar. 23, 2017, 29 pages.
U.S. Appl. No. 13/937,868, Non-Final Office Action dated Apr. 5, 2017, 23 pages.
U.S. Appl. No. 13/937,970, Advisory Action dated Apr. 13, 2017, 5 pages.
Chinese Application No. 201480035255.X, Office Action dated Feb. 27, 2017, 11 pages (5 pages for the original document and 6 pages for the English translation).
U.S. Appl. No. 13/937,483, filed Jul. 9, 2013, Notice of Allowance dated May 3, 2017, 5 pages.

(56) References Cited

OTHER PUBLICATIONS

U.S. Appl. No. 13/937,885 filed Jul. 9, 2013, Final Office Action dated May 19, 2017, 22 pages.

* cited by examiner

SOLUTION TO GENERATE A SCRIPTSET FOR AN AUTOMATED DATABASE MIGRATION

CROSS-REFERENCES TO RELATED APPLICATIONS

The present application is related to the following co-pending and commonly assigned U.S. Patent Applications: U.S. patent application Ser. No. 13/937,977 filed Jul. 9, 2013, entitled "METHOD AND SYSTEM FOR REDUCING INSTABILITY WHEN UPGRADING SOFTWARE;" U.S. patent application Ser. No. 13/938,061 filed Jul. 9, 2013, and entitled "CONSOLIDATION PLANNING SERVICE FOR SYSTEMS MIGRATION;" U.S. patent application Ser. No. 13/938,066 filed Jul. 9, 2013, and entitled "MIGRATION SERVICES FOR SYSTEMS;" U.S. patent application Ser. No. 13/937,885 filed Jul. 9, 2013, and entitled "DATABASE MODELING AND ANALYSIS;" U.S. patent application Ser. No. 13/937,868 filed Jul. 9, 2013 and entitled "AUTOMATED DATABASE MIGRATION ARCHITECTURE;" U.S. patent application Ser. No. 13/937,344 filed Jul. 9, 2013 and entitled "CLOUD SERVICES LOAD TESTING AND ANALYSIS;" U.S. patent application Ser. No. 13/937,483 filed Jul. 9, 2013, and entitled "CLOUD SERVICES PERFORMANCE TUNING AND BENCHMARKING;" U.S. patent application Ser. No. 13/937,545 filed Jul. 9, 2013, and entitled "ONLINE DATABASE MIGRATION;" U.S. patent application Ser. No. 13/937,486 filed Jul. 9, 2013 and entitled "DYNAMIC MIGRATION SCRIPT MANAGEMENT;" and U.S. patent application Ser. No. 13/937,970 filed Jul. 9, 2013, and entitled "ADVANCED CUSTOMER SUPPORT SERVICES—ADVANCED SUPPORT CLOUD PORTAL." The entire disclosure of the above listed applications are incorporated by reference into this application in their entirety and for all purposes.

BACKGROUND OF THE INVENTION

Moving a database from one server to another may be necessary or useful to allow for installation of software or upgrading of hardware resources. However, moving or migrating a database system can be a daunting task. Many database systems are often very complex and store critical data or perform mission critical services. Customers may have a limited ability to tolerate database systems being offline or experience corruption to any data. When database systems are to be migrated from a first server system to a second server system, the migration should be performed in a timely, efficient, and reliable manner. Conventionally, database migrations are highly personnel intensive, requiring a person (or a team of persons) to identify and use their judgment to figure out a strategic approach to perform the migration. Oftentimes, such human judgment can be time consuming, inconsistent, error prone, and result in the implementation of an inefficient migration scheme.

BRIEF SUMMARY OF THE INVENTION

In some embodiments, a method for preparing a migration between server systems includes a migration service that receives indications of a database object to be migrated from a source server system to a target server system. A copy operation for the database object is selected based upon characteristics the database object to be migrated. The copy operation may be selected from a copy rules list. An install operation for the database object is selected based upon characteristics the database object to be migrated. The install operation may be selected from a install rules list. A schedule for the migration of the database object may be determined, the schedule may be based on dependencies of the database object on other objects. A script may be generated that defines the copy and install operations for migrating the database object.

In embodiments the copy operation may be selected to reduce the time to perform the copy operation. Likewise, the copy operation may be selected to reduce the resources necessary to perform the copy operation. The install operation may be selected to reduce the time to perform the install operation. The install operation may be selected to reduce the resources necessary to perform the install operation. In embodiments the install operation may include steps necessary to recreate the database object on the target server. In embodiments a post processing operation for the database object may be further defined, the post processing operation may include changing the structure of the database object, the post processing operation included in the script.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
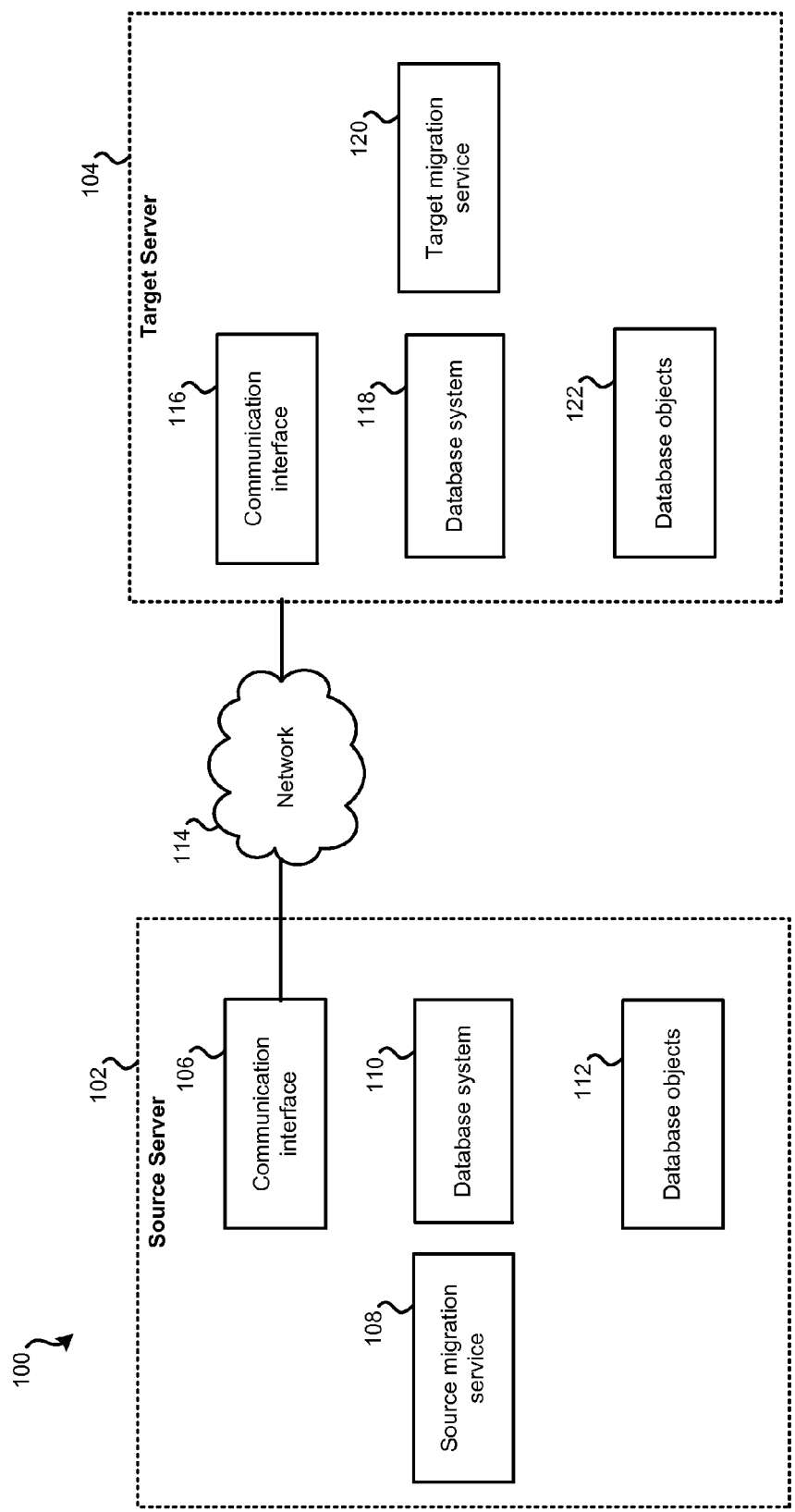
FIG. 1 illustrates an embodiment of a system configured to manage and perform a migration between server systems.

A database "migration" may be used to describe the movement or transfer of either the contents or the database files from one location to another location. A customer that plans to change the hardware platform, upgrade software, or wants to consolidate systems and databases may typically perform a database migration.

A database migration can involve multiple steps. First, databases and associated data storage arrangements (collectively referred to as "database objects") may be analyzed and prepared for migration. After the objects are prepared, some or all of the objects may be copied from the source server to the target system. Finally, after the objects are copied an installation step may be necessary to format or post process the data objects for the target system.

In a database migration it may be desirable to optimize the steps of copying and installing the objects at the target system. In embodiments, during these steps of migration the database may need to be taken offline to preserve data integrity between the source and target copy of data. Reducing or minimizing the time that a database if taken offline during migration may a critical priority for many customers. A disruption in service may mean lost revenues or a disruption of business activities.

In embodiments, the copy and install steps of migration may be optimized (i.e. optimized by reducing the time to perform the steps) by performing a more careful analysis of the database objects and preparation for the copy and installation steps. Optimization may also refer to reducing the time of migration, reducing the storage requirements, reducing manual analysis, and/or the like during migration.

The optimization of the copying and installation steps of a database migration may be accomplished, at least in part, by careful preparation and analysis of the database objects prior to the steps of copying and installation. In many scenarios, migration may be performed more timely, efficiently, and reliably if the source database and its data is first analyzed to determine the properties of the data, relationships, dependencies, and the like. The length of time of the copy and install steps of the migration may be reduced by careful analysis of the database objects prior to copying and installation. For example, a database may include different types of objects such as tables, indexes, mviews, and the like. For each of these object types, more than one copy and install methods may be available (e.g. datapump, export, PL/SQL, CTAS). The fastest or most appropriate copy and install method for each object may be different depending on the target database server, software version, dependencies, and the like. Likewise, objects such as indexes, foreign key constraints, primary key constraints, materialized views may be derived from other objects in the database.

Manual analysis of a complex database to determine an efficient migration strategy may be impractical or infeasible. In embodiments analysis of a database prior to migration may be performed by an automated or semi-automated migration service. The service may take as input parameters that describe the migration details, source and target servers, and the like and analyze the database to determine an efficient and reliable way to perform the migration. The migration analysis service may generate rules, scripts, schedules, and the like that may be used to perform the copy and install step of the migration. The output of the migration service may be used by other services and/or tools. A migration service may analyze a database and the database objects and determine appropriate copy and install operations for each database object. The service may analyze the dependencies and relationships between database objects to determine a schedule or an efficient order for copying and installing objects to a target server.

As used herein the term "source server system" may refer to a grouping of one or more computer systems that stores and/or executes a database. As used herein the term "target server system" may refer to a grouping of one or more computer systems that stores or executes the database installation after the migration. As used herein the term "migration" when referring to database may refer to the movement or transfer of the contents or the database files from one location, a source server system, to another location, a target server system. Migration may have multiple steps. A migration may involve an analysis and preparation, copy, and install steps. In embodiments a source server system and a target server system may be the same physical systems. A database may be migrated to a different virtual machine of server system. A database may be migrated into a new software version of the database and/or to a different operating system. Data may be moved or migrated into a new version of database software on a same physical server. In this application we will generally refer to a migration from a source server to a target server, but it is to be understood that migration may occur for databases on the same server, on the same system, and the like.

FIG. 1 illustrates a configuration of an embodiment of an environment for a migration. A migration may involve one or more source servers 102 and target servers 104. A source server 102 may include a database system 110. The database system 110 may include, or have access to database objects 112. The database objects 112 may include data tables, functions, data, procedures, and the like. Database objects may store data for the database, may include functions that transfer data, and the like. A database system may access the database objects and modify, read, write, add, or delete the objects. In a database migration, the database objects 112 of the source server 102 may be copied to the database objects 112 of the target server 104. The database system 118 of the target server 104 may be a different software version, different database system type, and the like. The database objects 112 may therefore require additional processing during the migration to ensure compatibility of the objects with the target server 104. To facilitate the migration process the source server 102 may use a source migration service 108. In some embodiments the target server 104 may use a target migration service 120 to perform installation, validation, and the like of the migration. In embodiments, the source migration service 108 and target migration service 120 may be the same service. In embodiments the source server and the target server may be, for example, the same server and the functions of the services may be combined.

In embodiments, the source migration service 108 and the target migration service 120 may analyze the source database 110, source database objects 112 and the target database system 118 and the target database objects 112. The migration services 108, 120 may prepare the data objects for copying and installation. In some embodiments the migration services 108, 120 may, after analysis of the source server 102 and the target server 104, first generate a migration package. The migration package may include a collection of scripts, rules, schedules, executables, and/or the like that may be run or executed on the source server 102 and/or the target server 104 to perform the copying and installation steps of the migration.

The source migration service 108 and/or the target migration service 120 may be a software module, a hardware module, virtual appliance, code, scripts, and the like. The source migration service 108 and/or the target migration service 120 may be a service that may be deployed by a platform. In embodiments, the source migration service 108 and/or the target migration service 120 may be developed, deployed and monitored at the source server 102 and target server 104 respectively using a support cloud platform. A portal and a gateway of the support cloud platform may be used to remotely deploy, manage, and monitor the services 108, 120. Embodiments of the support cloud portal has been described in the co-pending and commonly assigned U.S. patent application Ser. No. 13/937,970, filed Jul. 9, 2013 and entitled "ADVANCED CUSTOMER SUPPORT SERVICES—ADVANCED SUPPORT CLOUD PORTAL" herein incorporated by reference in its entirety and for all purposes.

Figure 2:
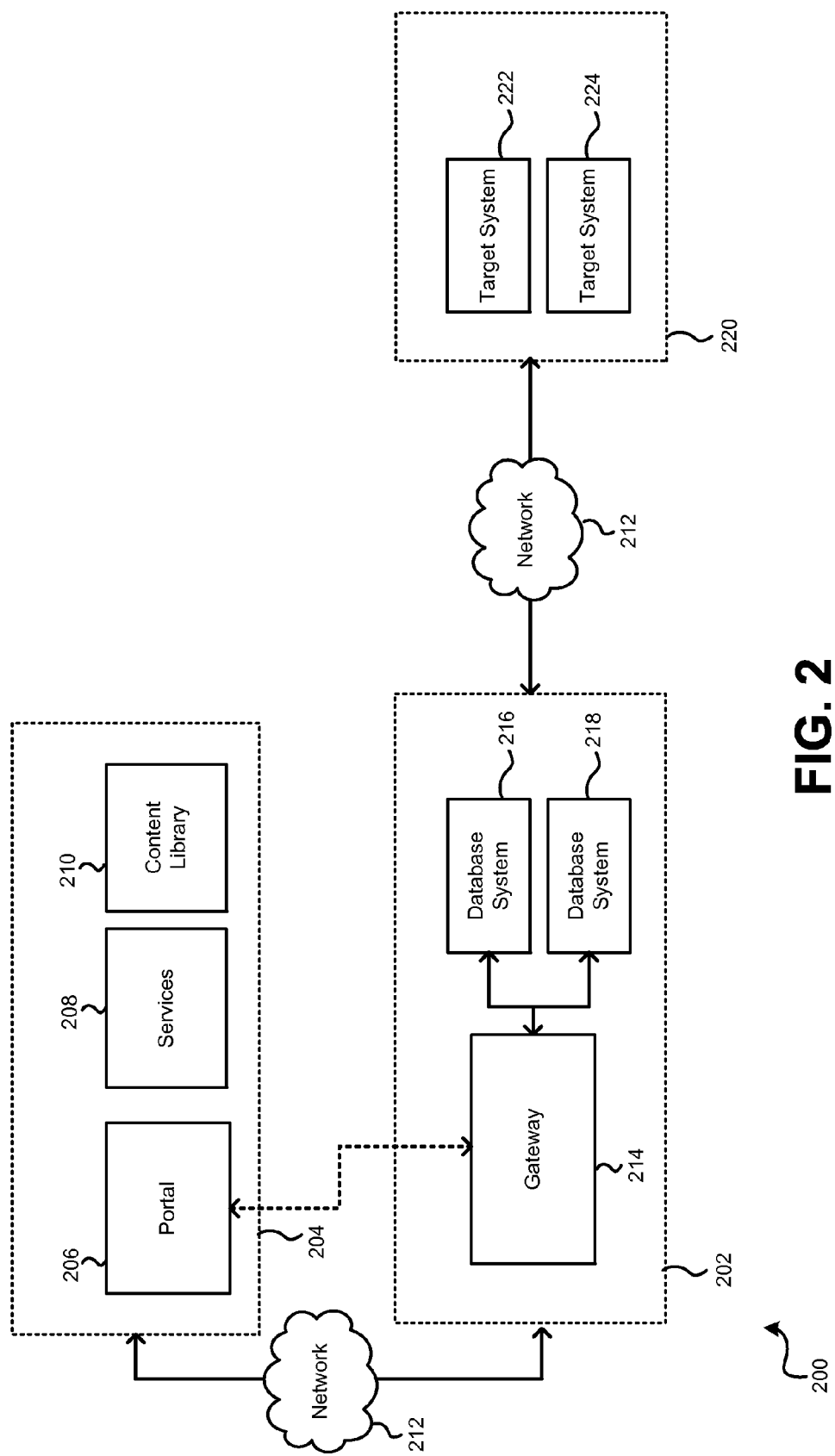
FIG. 2 illustrates an embodiment of a support platform system.

FIG. 2 illustrates a block diagram of an embodiment of a support cloud platform 200. The platform may be used to remotely deploy the migration services 108, 120 to one or more database systems 216, 218 on a customer's data center 202. The services may be deployed and monitored from a remote production cloud 204 via a network 212. The services 108, 120 may be deployed from the portal 206 to a gateway 214 of the customer's data center 202. The gateway may be used to deploy the services to servers and database systems 216, 218 of the customer's data center. During the execution of the services 108, 120, the gateway may monitor the service and collect data. The data may be stored, analyzed, and displayed using the portal 206. The production cloud may include a collection of available services 208 and a content library 210 that may be delivered to the gateway 214. Different services may be provided for different steps of the migration process. One service may perform, for example, migration preparation, whole another may perform the copying of data objects. A specific service may be used to perform migration from one database system 216 to another database system 218 that are inside a customer's data center 202, while a different service may be needed to perform migration from the customer's data center 202 to a target system 222, 224 in a remote data center 220. Each service may be selected, deployed, and monitored using the portal 206.

Figure 3:
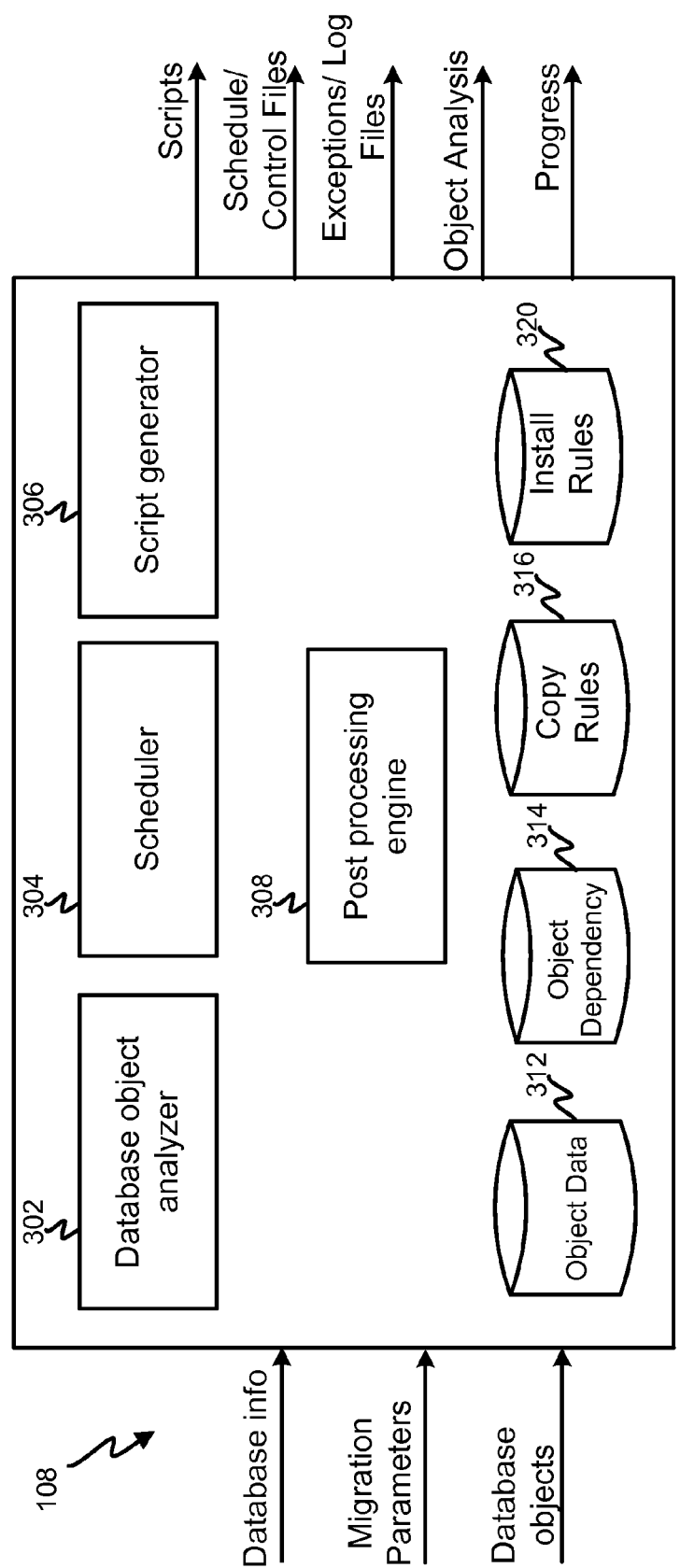
FIG. 3 illustrates an embodiment of a migration service.

In embodiments, a source migration service 108 for performing analysis of data objects may be deployed using the portal 206. The service may analyze the data objects and output a migration package such that may be used by other services and/or executed to perform copying and installation steps of the migration. A block diagram of the components and modules that may be included in an embodiment of the source migration service 108 are illustrated in FIG. 3. The service may take as input database information, migration parameters, and/or database objects information. Based on the migration parameters, the types of data objects, and database system information, the migration service 108 may generate a migration package that may be used to perform the copy and install steps of the migration. The migration package may be used by the service, another service, or executed or initiated independently to execute the next steps of migration. In one embodiment the migration package may include scripts, analysis of database objects, a schedule for executing or running the scripts, exceptions or possible incompatibilities in the migration, and/or control files for ordering or scheduling the copy and install steps of the migration. The scripts, schedule, and analysis of objects may be used to perform the copy and install steps of migration.

The scripts that the migration service generates may specify the how to copy or install one or more database objects. They may specify particular procedure used for the copy or install of a specific database object. The schedule may further define the order or the dependencies of the database objects and scripts. The schedule may define the order that the scripts may need to be executed, which scripts may be run in parallel, and the like. The object analysis output may include additional dependencies between objects and/or users schemas may be used by other services or tools in the migration process.

The operations defined in the scripts, the schedule of the scripts and the like may be optimized by the migration service 108. The service may automatically optimize the scripts and schedule and operations defined in the scripts to reduce the time required to perform the copy and install steps of the migration compared to a copy and install operation that copies and installs the database objects in a series. In some embodiments the optimization may include a reduction in size, reduction in computation resources to perform the copy and install operations, and the like.

The migration service 108 may perform analysis on the database objects to determine the copy and install operation that are the most appropriate for the type or size of the database object. The migration service 108 may include a database object analyzer 302. The database object analyzer may be used to determine the properties of the objects in the database, how big these objects are, and/or dependencies. For each object or a collection of database objects the database object analyzer may determine an appropriate method for copying and installing the object in the target system. For example, each database object, or a collections of objects, the database object analyzer may chose a copy operation which may include export data dump, export, create table as select, and/or the like.

In some embodiments, the migration service 108 may include copy rules 316 and/or install rules 320. The copy 316 and install 320 rules may define the preferred or optimal operations to use for copy and install operations based on the type of database object, the size of the object, the characteristics of the source or target server, and/or the like. The database object analyzer 302 may determine the database object characteristics. The database object analyzer 302 may query the copy rules 316 and/or the install rules 320 with the database object characteristics to determine a preferred copy and/or install operation for the object, and the source or target system. For example, based on the availability of bandwidth of the communication channel between the source and target servers, the copy rules may return a specific copy operation based on the size of the database object for communication channels with low bandwidth. The copy operations for large objects may include a compression operation prior to transmitting the large object over the communication channel.

In embodiments, the copy and install rules 316, 320 may provide more than one copy and install operations for each object. Different copy and install operations may be defined based on the optimization criteria for the migration. In embodiments the copy and install rules may be based on empirical tests and/or predicted performance. The rules may be developed from tests for each type of operation on different object types. The tests may be measured for their completion times, resource requirements, and complexity. The copy and install rules may be selected from the tests. In other embodiments the copy and install rules may be developed by the migration service by performing a series of copy and install test operations using the source and target servers. The migration service may perform a series of test copy and install operations using a set of test database objects. The migration service may measure the time to perform these operations, the resources used, and/or the like. Based on the tests the migration service may develop a set of copy 316 and install 320 rules to use for the specific migration.

In embodiments, the copy rules 316 and install rules 320 may include a specific execution order, a sequence or routine of two or more steps on the target to create the object and/or to import the data.

The object analyzer 302 may analyze each object to determine if it may be recreated from other objects. Some database objects may be redundant, or may be supporting database objects that are generated from other database objects. The redundant database objects may not be copied to the target but instead recreated at the target from other database objects. For example, a database object may include an index. Indexes may allow for faster and/or more efficient querying of the database. In some embodiments indexes cannot be copied, they must be recreated on the target system. The object analyzer may define how to recreate database objects at the target server and may include instructions and methods on the most efficient ways and order to recreate these objects.

The migration service 108 may further include a scheduler module 304. The scheduler module 304 may analyze the dependencies of the database objects. Some database objects may be related to other database objects. In some cases, some database objects may not be copied or installed until one or more other database objects have been copies and installed. The dependencies may be determined by the scheduler 304. The scheduler may build a schedule and/or control files that capture an order the objects may be copies and installed during migration. The schedule and/or control files may provide for a defined order of execution of the scripts generated by the migration service. In some embodiments, the schedule and/or control files generated by the scheduler 304 may identify the dependencies and/or only identify database objects or operation that may be performed in parallel or simultaneously. In embodiments, the scheduler 304 may generate a control structure which may enable another service or tool to find an optimum sequence or schedule for the migration run.

For example, when the scheduler 304 identifies an index as a database object the scheduler may identify other tables, views, or data the index references (e.g. foreign key constraints) Foreign key constraints, for example, can only be created if the index they depend on already exists in the target system. The some embodiments the scheduler may generate a schedule specifying that the scripts used to copy and install database objects that are referenced by the index have to be executed first prior to the script that recreates the index at the target server.

In embodiments the dependencies may include, for example, database types, functions, primary key constraints, foreign key constraints, procedures, referenced either in the same schema or a different user schema.

The migration service 108 may further include a post processing engine 308 to determine additional operations required for each database object during migration. In embodiments database objects may be transformed, compressed, reformatted, partitioned into multiple objects, and/or the like. In some embodiments the target server database system may include new features or requirements. The new features or requirements may require a transformation of the database objects or a change of the structure of the database objects. In some embodiments changes to database objects may be performed to increase database performance, reduce the storage requirements for the database object, change organization of data, and the like. The post processing engine 308 may analyze the migration parameters and/or the database information received by the migration service 108 to determine post processing operations.

The post processing engine 308 may be used change the table space layout, table contents, data values, data formats, and the like. Changes in the data structure that may normally be difficult to make when a database is online may be made during migration. For example all database objects associated with one user on the source system may be changed to be associated with a different user on the target system.

For example, the post processing engine may include table compression, LOB compression, index compression, partitioning, updating column types from LONG/LONG RAW to CLOB/BLOB, introducing secure files, and character set conversion.

The output of the database object analyzer 302, scheduler 304, and the post processing engine 308 may be used by the script generator 306 to generate the scripts. A script may define the copy and install operations for one or more database objects. For some objects that are not copied, the script may define operations for recreating the object at the target. A script may be generated for every database object that is migrated. In some embodiments the script may define operations for more than one database object. The script generator 306 may be configured to group the definitions for one or more migration operations into one script. In some embodiments, the migration operations for a single database object may be split into more than one script. Splitting the operations may be beneficial for very large objects allowing more scheduling configurations.

Figure 4:
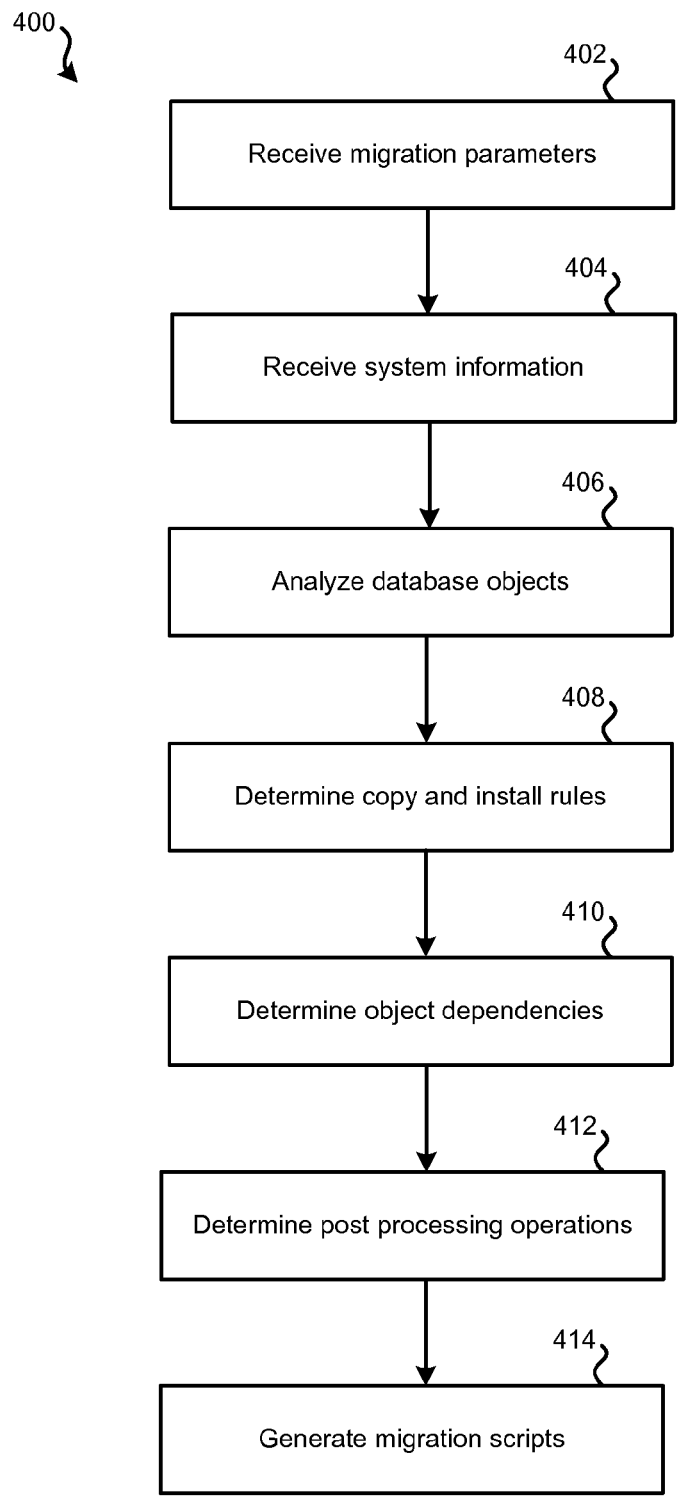
FIG. 4 illustrates an embodiment of a method for generating a script for migration.

FIG. 4 illustrates a flow diagram for one embodiment of a method 400 for analyzing and preparing database objects for migration using the migration service 108. In block 402 the migration service 108 may receive migration parameters defining the general characteristics of the migration. The migration parameters may include definitions which specify constraints on the migration and/or optimization criteria for preparing the migration. In some embodiments the optimization criteria may be the time to perform the copy and install steps of the migration, the size of the footprint of the migrated database objects, and the like. In some embodiments the migration parameters may specify additional transformations or modification of the database objects that should be performed during the migration. The transformation may include, for example, compression of data, partitioning or merging of database objects, and the like.

In block 404, the migration service may receive system information pertaining to the structure, version, organization, and the like of the source server, target server and/or database system. The system information may be received from system schema and/or from system definitions. In some embodiments the migration service 108 may perform a scan of the source or target system to determine information relevant for migration.

In block 406, the database object analyzer 302 may receive and analyze the database objects. The database objects may be analyzed for their size, properties, types, structure, organization and/or the like. The database object analyzer may store the properties of the database object in the object data 312 module.

In block 408, the database object analyzer may determine the appropriate copy and install operations for each database object. The object analyzer may use one or more copy rules 316 and install rules 320 to determine operations that match the type of the database object, the size of the object, the optimization criteria for the migration, and/or the like.

In block 410, the scheduler 304 of the migration service 108 may determine the database object dependencies and/or a schedule for copying and installing database objects. The scheduler may determine the an order the database objects need to be copied and installed, which database objects may be processed, copied, or installed in parallel and the like. The dependencies may be stored in the object dependency module 314 of the migration service 108 and used to create a schedule for the objects or create one or more control files that may be used by other schedulers or services to generate a schedule for the copy and install steps of the migration.

In block 414 the script generator 306 may generate scripts that may be used to perform the copy and install operations of the migration. The script generator may use one or more of the outputs of the scheduler 304, database object analyzer 302, or the post processing engine 308 to generate the scripts. In embodiments the script generator 306 may generate thousands of scripts. In some embodiments each script may be created for each database object. The script may include definitions for operations required to copy and install the database object during migration. In some embodiments scripts may be executed by an interpreter, a script engine, or the like. The scripts, if executed in the right order, may be used to perform a migration of the database objects from the source server to the target server.

The analyzing and preparing database objects for migration 400 may be performed autonomously by the migration service 108 while the database is online. The analysis may be performed without requiring the database or the database system to be taken offline. The time and/or resources required to perform the analysis and preparation step to generate the scripts for the migration may not be critical and may be performed in an iterative manner until a suitable set of scripts and migration schedule is determined.

In some embodiments, during the analysis of database objects and preparation of scripts for migration, the migration service 108 may write to a log file tracking the analysis and preparation. The log file may be used by a system administrator to track and audit the actions and steps performed by the migration service. The log files may be used to analyze and audit the effectiveness of the migration service at meeting the optimization criteria for the migration. The effectiveness of the migration service 108 may be modeled by the administrator. If the migration service 108 does not meet optimization goals (with respect to migration time, resource usage, etc.) the migration options and rules of the migration service may be modified and the service rerun. The service may be rerun to generate a new of scripts and control files. The migration service may be run many times until the migration goals and optimizations are satisfied. The migration service may be run while the database system is online.

In embodiments the log files may be captured by the portal 206 of the support cloud platform 200. Log files may be transmitted from the source server to the gateway 214 and to the portal 206. The portal may be used to analyze the log files and determine the expected run time of the migration. The results may be presented to a customer or administrator to determine if the migrations scripts meet the desired specifications.

Figure 5:
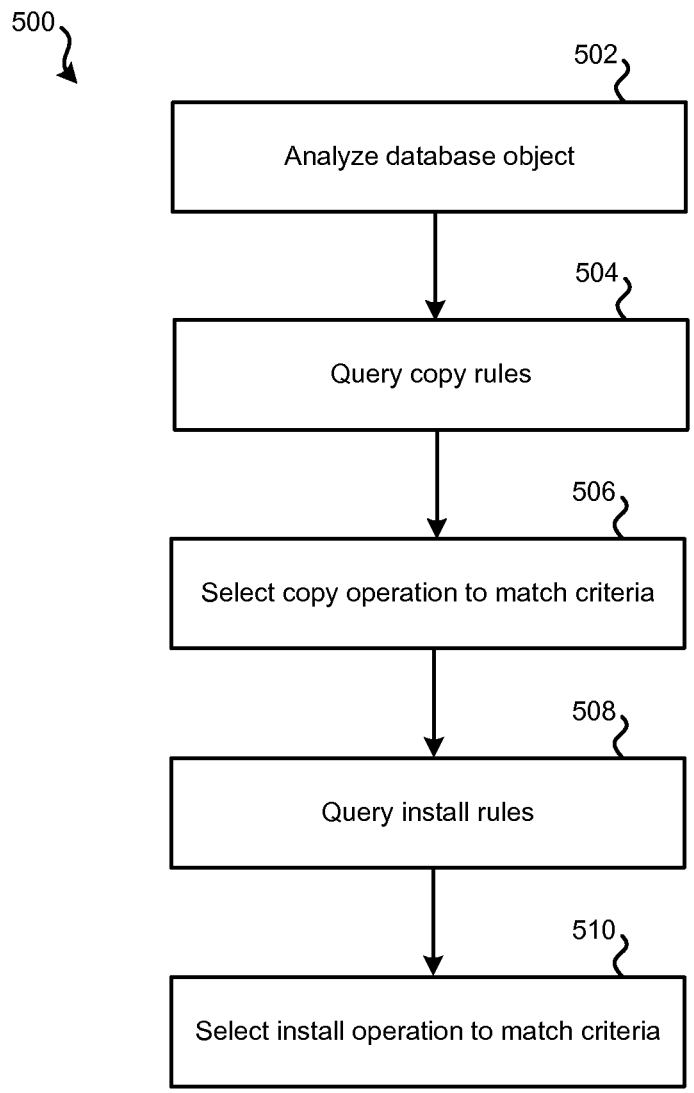
FIG. 5 illustrates an embodiment of a method for determining copy and/or install operations for a database object.

FIG. 5 illustrates a flow diagram for one embodiment of a method 500 for determining copy and/or install operations for a database object. In block 502 the database object analyzer 302 may receive and analyze the database object. The database object may be analyzed to determine its parameters which may include its size, type, date of creation, date of edit, type of object, and the like. Based on the parameters the database object analyzer 302 may query copy rules in block 504. The copy rules may be stored in a file, database, spreadsheet, and the like on the same physical server as the migration service is deployed on. In some embodiments the copy rules may be stored in a remote repository such as a portal 206 or a production cloud 204. The copy rules may define one or more operations for performing a copy of the database object from the source server to the target server. The operation may be defined specifically for each type of database object, the size of the database object and the like. Each type of database object may have a different copy operation that results in the fastest copy of the database object, the smallest use of resources, and the like. The query of the copy rules may return one or more different operations for performing the copy, the object analyzer may select one of the operations and associate it with the database object in block 506.

In block 508, the database object analyzer 302 may query install rules. The install rules may be stored in a file, database, spreadsheet, and the like on the same physical server as the migration service is deployed on. In some embodiments the install rules may be stored in a remote repository such as a portal 206 or a production cloud 204. The install rules may define one or more operations for performing an install of the database object at the target server after the object has been copied to the target server. The operation may be defined specifically for each type of database object, the size of the database object and the like. Each type of database object may have a different install operation that results in the fastest install of the database object, the smallest use of resources, and the like. The query of the copy rules may return one or more different operations for performing the install, the object analyzer may select one of the operations and associate it with the database object in block 510.

It is to be understood that the structure, order, and number of modules, block, and the like shown and described in the figures of this disclosure may be changed or altered without deviating from the spirit of the disclosure. Modules may be combined or divided into multiple other modules, for example. They functionality of the modules may be implemented with software, scripts, hardware and the like.

Figure 6:
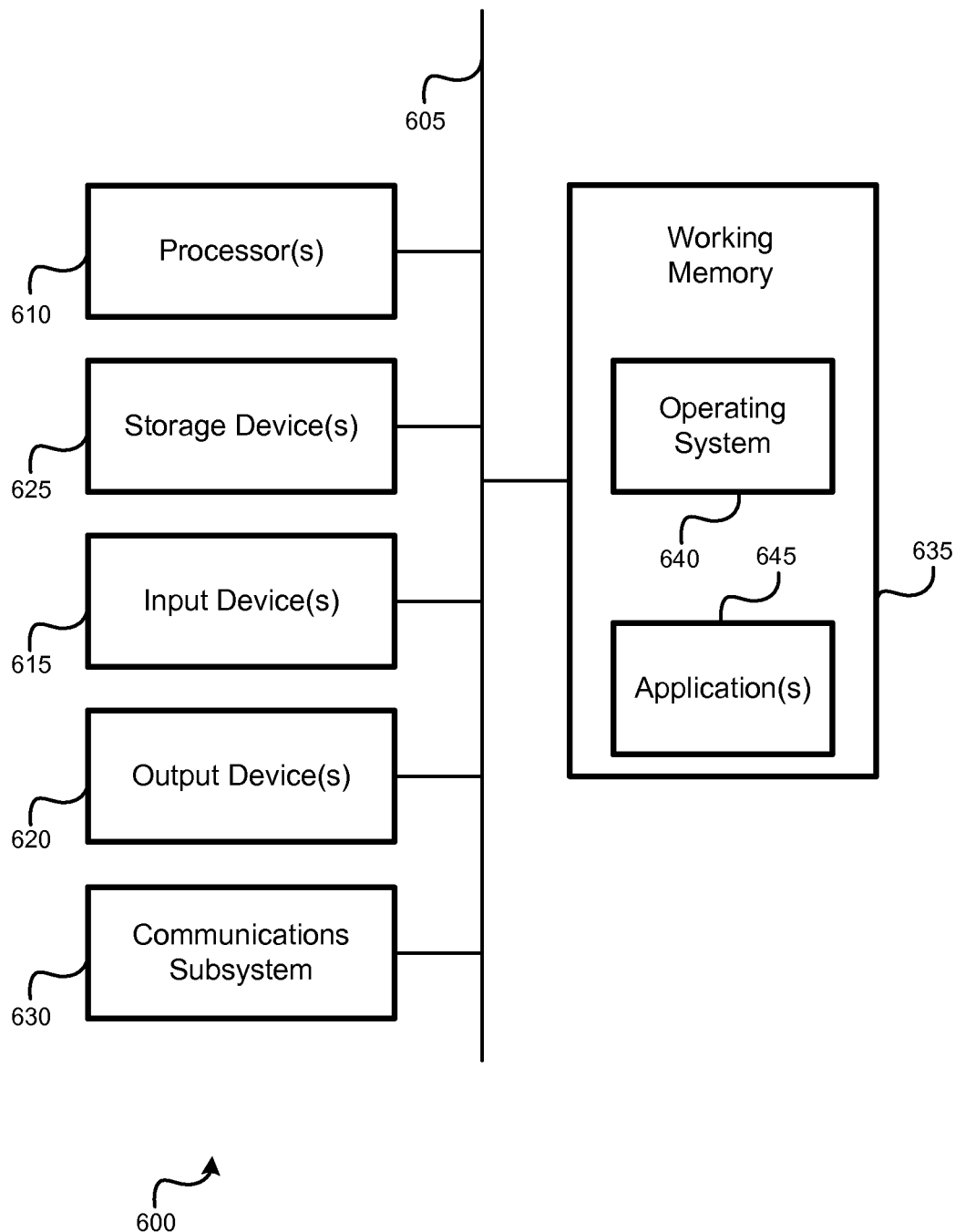
FIG. 6 illustrates an embodiment of a computer system.

FIG. 6 illustrates an embodiment of a computer system. A computer system as illustrated in FIG. 6 may be incorporated as part of the previously described computerized devices, the source server, target server, migration service, etc. FIG. 6 provides a schematic illustration of one embodiment of a computer system 600 that can perform various steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, video decoders, and/or the like); one or more input devices 615, which can include without limitation a mouse, a keyboard, remote control, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computer system 600 can be distributed across a network. For example, some processing may be performed in one location using a first processor while other processing may be performed by another processor remote from the first processor. Other components of computer system 600 may be similarly distributed. As such, computer system 600 may be interpreted as a distributed computing system that performs processing in multiple locations. In some instances, computer system 600 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, wellknown circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for preparing a migration between server systems, the method comprising:
    receiving, by a migration service comprising one or more processors communicatively coupled to one or more memories, indications of a database object to be migrated from a source server system to a target server system;
    analyzing, by the migration service, characteristics of the database object to be migrated, wherein the characteristics comprise a size of the database object;
    based at least partially on results of the analyzing, selecting, by the migration service, a copy operation and an install operation at least in part by:
        selecting the copy operation for the database object based at least partially on the characteristics and an indication of bandwidth of a communication channel between the source server system and the target server system, the copy operation selected from a copy rules list, wherein the copy operation comprises a compression operation for the database object based at least partially on the indication of the bandwidth; and
        selecting the install operation for the database object based at least partially on the characteristics, the install operation selected from a install rules list;
    determining, by the migration service, a schedule for the database object, the schedule based at least partially on dependencies of the database object on other objects; and
    generating a script, the script defining the copy operation and the install operation for migrating the database object.

2. The method of claim 1, wherein the copy operation is selected to reduce a time to perform the copy operation.

3. The method of claim 1, wherein the copy operation is selected to reduce a resources necessary to perform the copy operation.

4. The method of claim 1, wherein the install operation is selected to reduce a time to perform the install operation.

5. The method of claim 1, wherein the install operation is selected to reduce a resources necessary to perform the install operation.

6. The method of claim 1, wherein the install operation comprises recreating the database object on the target server system.

7. The method of claim 1, further comprising defining a post processing operation for the database object, the post processing operation includes changing a structure of the database object, the post processing operation included in the script.

8. The method of claim 1, further comprising defining a post processing operation for the database object, the post processing operation includes compressing the database object, the post processing operation included in the script.

9. A system for preparing a migration between server systems, the system comprising:
    one or more processors communicatively coupled to one or more memories, the one or more processors to provide:
        a migration service, configured to receive indications of a database object to be migrated from a source server system to a target server system;
        an object analyzer, configured to:
            analyze characteristics of the database object to be migrated, wherein the characteristics comprise a size of the database object;
            based at least partially on results of the analyzing, select a copy operation and an install operation at least in part by:
                selecting the copy operation for the database object based at least partially on the characteristics and an indication of bandwidth of a communication channel between the source server system and the target server system, the copy operation selected from a copy rules list, wherein the copy operation comprises a compression operation for the database object based at least partially on the indication of the bandwidth;
                defining a post processing operation for the database object, the post processing operation comprising compressing the database object; and
                select the install operation for the database object based at least partially on the characteristics, the install operation selected from a install rules list;
        a scheduler, configured to determine a schedule for the database object, the schedule based at least partially on dependencies of the database object on other objects; and
        a script generator, configured to generate a script, the script defining the copy operation and the install operation for migrating the database object.

10. The system of claim 9, wherein the object analyzer is configured to select the copy operation which minimizes a time to perform the copy operation.

11. The system of claim 9, wherein the object analyzer is configured to select the copy operation which minimizes a resources necessary to perform the copy operation.

12. The system of claim 9, wherein the object analyzer is configured to select the install operation which minimizes a time to perform the install operation.

13. The system of claim 9, wherein the object analyzer is configured to select the install operation which minimizes a resources necessary to perform the install operation.

14. A computer program product residing on a non-transitory, processor-readable medium and comprising processor-readable instructions configured to cause one or more processors to:
receive indications of a database object to be migrated from a source server system to a target server system;
analyze characteristics of the database object to be migrated, wherein the characteristics comprise a size of the database object;
based at least partially on results of the analyzing, select a copy operation and an install operation at least in part by:
selecting the copy operation for the database object based at least partially on the characteristics and an indication of bandwidth of a communication channel between the source server system and the target server system, the copy operation selected from a copy rules list, wherein the copy operation comprises a compression operation for the database object based at least partially on the indication of the bandwidth;
defining a post processing operation for the database object, the post processing operation comprising compressing the database object; and
selecting the install operation for the database object based at least partially on the characteristics, the install operation selected from a install rules list;
determine a schedule for the database object, the schedule based at least partially on dependencies of the database object on other objects; and
generate a script, the script defining the copy operation and the install operation for migrating the database object.

15. The computer program product of claim 14, wherein the copy operation is selected to minimize a time to perform the copy operation.

16. The computer program product of claim 14, wherein the copy operation is selected to minimize a resources necessary to perform the copy operation.

17. The computer program product of claim 14, wherein the install operation is selected to minimize a time to perform the install operation.

18. The computer program product of claim 14, wherein the install operation is selected to minimize a resources necessary to perform the install operation.

19. The computer program product of claim 14, wherein the install operation comprises recreating the database object on the target server system.

20. The computer program product of claim 14, further comprising instructions configured to cause one or more processors to define a post processing operation for the database object, wherein the post processing operation includes changing a structure of the database object, the post processing operation included in the script.

* * * * *

UNITED STATES PATENT AND TRADEMARK OFFICE
CERTIFICATE OF CORRECTION

PATENT NO. : 9,747,311 B2
APPLICATION NO. : 13/937988
DATED : August 29, 2017
INVENTOR(S) : Buehne et al.

Page 1 of 1

It is certified that error appears in the above-identified patent and that said Letters Patent is hereby corrected as shown below:

On page 3, Column 1, under Other Publications, Line 53, after "Quality" delete "of".

In Column 4, Line 58, delete "2013" and insert -- 2013, --, therefor.

In Column 14, Line 51, in Claim 9, delete "select" and insert -- selecting --, therefor.

Signed and Sealed this
Twelfth Day of June, 2018

Andrei Iancu
*Director of the United States Patent and Trademark Office*